US008325706B2

United States Patent
Pacella

(10) Patent No.: US 8,325,706 B2
(45) Date of Patent: Dec. 4, 2012

(54) HIERARCHICAL SEGMENTED LABEL SWITCHED PATHS

(75) Inventor: Dante J Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 701 days.

(21) Appl. No.: 11/945,017

(22) Filed: Nov. 26, 2007

(65) Prior Publication Data

US 2009/0135815 A1    May 28, 2009

(51) Int. Cl.
*H04L 12/28* (2006.01)
(52) U.S. Cl. ............... 370/351; 370/389; 370/395.5; 709/252
(58) Field of Classification Search .......... 370/351, 370/352, 389, 395.5; 709/242
See application file for complete search history.

(56) References Cited

U.S. PATENT DOCUMENTS

| 6,765,921 | B1 | 7/2004 | Stacey et al. | |
|---|---|---|---|---|
| 6,985,488 | B2 | 1/2006 | Pan et al. | |
| 7,664,877 | B1 * | 2/2010 | Sheth | 709/242 |
| 2003/0081589 | A1 | 5/2003 | Marian et al. | |
| 2003/0142671 | A1 * | 7/2003 | DeRango et al. | 370/390 |
| 2003/0210705 | A1 * | 11/2003 | Seddigh et al. | 370/419 |
| 2004/0133619 | A1 * | 7/2004 | Zelig et al. | 709/200 |
| 2004/0228323 | A1 * | 11/2004 | Acharya et al. | 370/351 |
| 2004/0246972 | A1 * | 12/2004 | Wang et al. | 370/395.5 |
| 2005/0213513 | A1 | 9/2005 | Ngo et al. | |
| 2006/0250961 | A1 | 11/2006 | Vasseur | |
| 2007/0101018 | A1 | 5/2007 | Shirazipour et al. | |
| 2007/0245034 | A1 | 10/2007 | Retana et al. | |
| 2010/0040061 | A1 * | 2/2010 | McGuire et al. | 370/392 |

FOREIGN PATENT DOCUMENTS

WO    WO-00/36871    6/2000

OTHER PUBLICATIONS

Hummel; et al., "Hierarchical LSP draft-hummel-mpls-hierarchical-lsp-02.txt," IETF Standard-Working-Draft, Internet Engineering Task Force, IETF, CH, No. 2, Oct. 1, 2002.
Kompella, et al., "LSP Hierarchy with Generalized MPLS TE; draft-ietf-mpls-lsp-hierarchy 08.txt," IETF Standard-Working-Draft, Internet Engineering Task Force, IETF, CH, vol. mpls, No. 8, Sep. 1, 2002.

* cited by examiner

*Primary Examiner* — Dang Ton
*Assistant Examiner* — Robert M Morlan

(57) ABSTRACT

A network may include a first set of routers at a first level of a multi-protocol label switched tunneling hierarchy and a second set of routers at a second level of the multi-protocol label switched tunneling hierarchy, the second set of routers connected to the first set of routers in a partially meshed topology. The network may also include a hierarchical segmented label switched path. The hierarchical segmented label switched path may include a forwarding adjacency label switched path including a subset of the first set of routers, and a label switched path coupled to the forwarding adjacency label switched path, the label switched path including a subset of the second set of routers.

20 Claims, 7 Drawing Sheets

HIERARCHICAL SEGMENTED LABEL SWITCHED PATHS

BACKGROUND INFORMATION

Today's Multi-Protocol Label Switching (MPLS) networks may permit network resources to be reserved for different services. In some MPLS networks, the resources may be reserved via Resource Reservation Protocol-Traffic Engineering (RSVP-TE).

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

Figure 1:
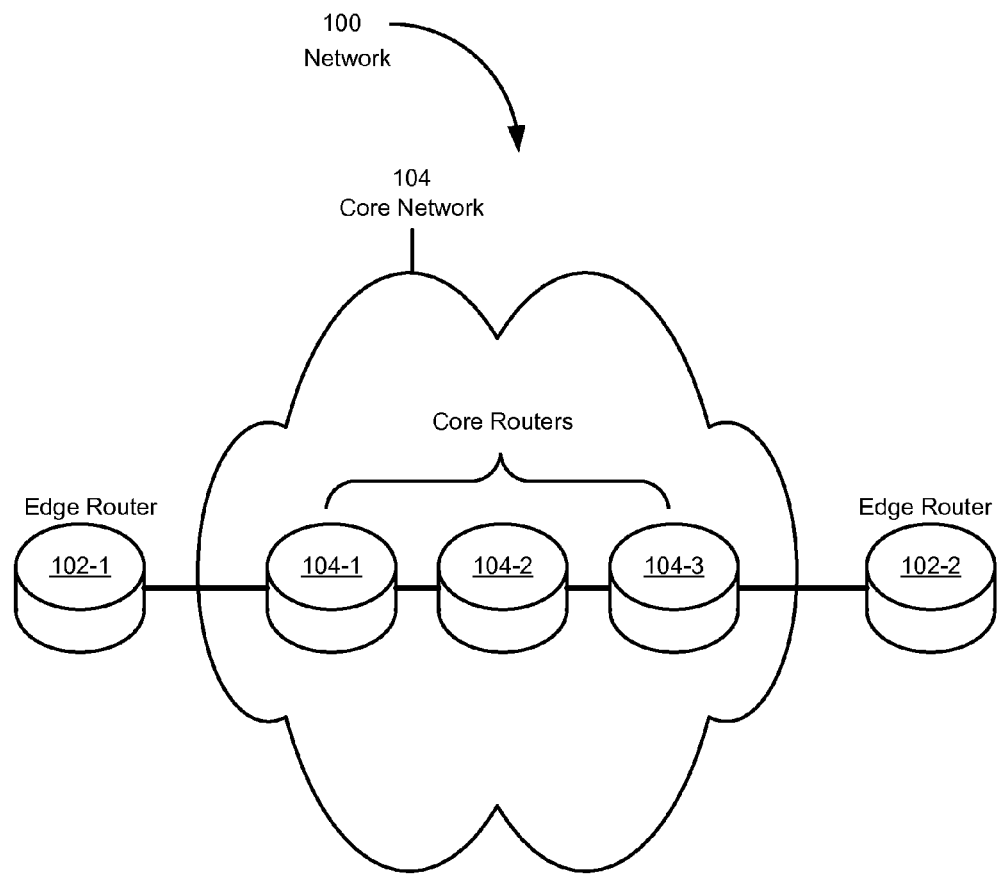
FIG. 1 is a block diagram of a simplified Multi-Protocol Label Switched (MPLS) network that illustrates concepts described herein.

The following detailed description refers to the accompanying drawings. The same reference numbers in different drawings may identify the same or similar elements.

As used herein, the term "router" may refer to a network layer 2 or layer 3 (e.g., an Internet Protocol (IP) level) router or a switch. Depending on context, a "router" may also refer to a Multi-Protocol Label Switching (MPLS) router/switch and/or a router that is both a layer 2/3 and a MPLS router.

The term "packet," as used herein, may refer to an IP packet, datagram, cell, a fragment of an IP packet, or other types of data that may be carried at a specified communication layer. For example, a packet may refer to an IP packet that has been augmented with additional header fields (e.g., MPLS labels).

The term "tunnel" or "MPLS tunnel," as used herein, may refer to a Label Switched path (LSP) (e.g., a logical path) that begins at an ingress router and terminates at an egress router. If a MPLS tunnel is embedded or nested in another MPLS tunnel, the inner MPLS tunnel may be said to be at a higher level of tunneling hierarchy than the outer MPLS tunnel.

The term "Resource Reservation Protocol-Traffic Engineering (RSVP-TE)" or "TE-RSVP," as used herein, may refer to a protocol that supports reservation of network resources (e.g., bandwidth) across a network. RSVP-TE may be used to establish LSPs in a MPLS network.

The term "metric" or "routing metric," as used herein, may refer to a value used in a routing protocol or a routing algorithm to determine an optimal route (e.g., whether one route is preferred over another route). A metric may be based on one or more of bandwidth, delay, hop count, path cost, traffic, reliability, etc.

The terms "fully meshed network" or "fully meshed topology," as used herein, may refer to a network or a network configuration in which each node of the network is connected to all other nodes the network. Similarly, "partial mesh," "partially meshed network," or "partially meshed topology," as used herein, may refer to a network in which at least one node is not connected to all other nodes in the network.

In aspects described herein, a MPLS network may be configured to establish hierarchical segmented LSPs under the RSVP-TE. In a hierarchical MPLS network, different network switches/routers may be assigned to different levels of LSP tunneling hierarchy. For example, a backbone router (e.g., a core router) may be assigned a level that is higher than that of a distribution router serving a smaller portion of the network (e.g., a metro router).

In the hierarchical MPLS network, if the routers are grouped according to levels of LSP tunneling hierarchy and other properties (e.g., physical proximity), each group may be interconnected to other groups to limit the number of LSPs that are to be determined by the routers in the hierarchical MPLS network. By limiting the number of LSPs that a router may determine, computational costs and network load that are associated with routing and packet forwarding in the network may be reduced. Such a hierarchical MPLS network may be called a hierarchical segmented MPLS network.

FIG. 1 is a block diagram of a simplified MPLS network 100 that illustrates concepts described herein. As shown, MPLS network 100 may include provider edge routers 102-1 and 102-2 and a core network 104, which may include core routers 104-1, 104-2, and 104-3. Provider edge routers 102-1 and 102-2 may include routers that provide an entry and/or an exit to and from MPLS network 100, and may communicate with other routers that are in customer premises (not shown). Core routers 104-1, 104-2, and 104-3 may include label switching (LS) routers that provide a path across core network 104. While routers 102-1, 102-2, 104-1, 104-2, and 104-3, do not have revenue generating (e.g., customer-facing) ports, they still may provide network resiliency, scaling, and/or aggregation for traffic, LSPs, IP addressing, and/or physical circuits.

In FIG. 1, routers 102-1, 102-2, 104-1, 104-2, and 104-3 may be assigned to two different levels of LSP tunneling hierarchy and therefore, may be segregated into two or more groups. Furthermore, as shown, core routers 104-1 and 104-3 may be arranged so that they may form forwarding adjacencies in relation to routers 102-1 and 102-2. To routers 102-1 and 102-2, each of core routers 104-1 and 104-3 may provide a tunneling endpoint that appears as being adjacent to the other endpoint via a forwarding adjacency LSP. Each of provider edge routers 102-1 and 102-2 may be attached to a core router.

In FIG. 1, a full tunneling path may extend from provider edge router 102-1 to provider edge router 102-2. The full tunneling path may include four LSPs: a LSP segment between provider edge router 102-1 and core router 104-1, a LSP segment between core routers 104-1 and 104-2, a LSP segment between core routers 104-2 and 104-3, and a LSP segment between core router 104-3 and provider edge router 102-2. Because the four LSP segments may pass through different levels of LSP tunneling hierarchy, the full path may be termed a "hierarchical segmented LSP."

In MPLS network 100, the total number of LSPs (e.g., four LSPs in network 100) may be limited by the topological arrangement of member routers. If, however, routers 102-1, 102-2, 104-1, 104-2, and 104-3 are arranged in a network having a different topology, such as a fully meshed network, the number of LSPs may increase.

Figure 2:
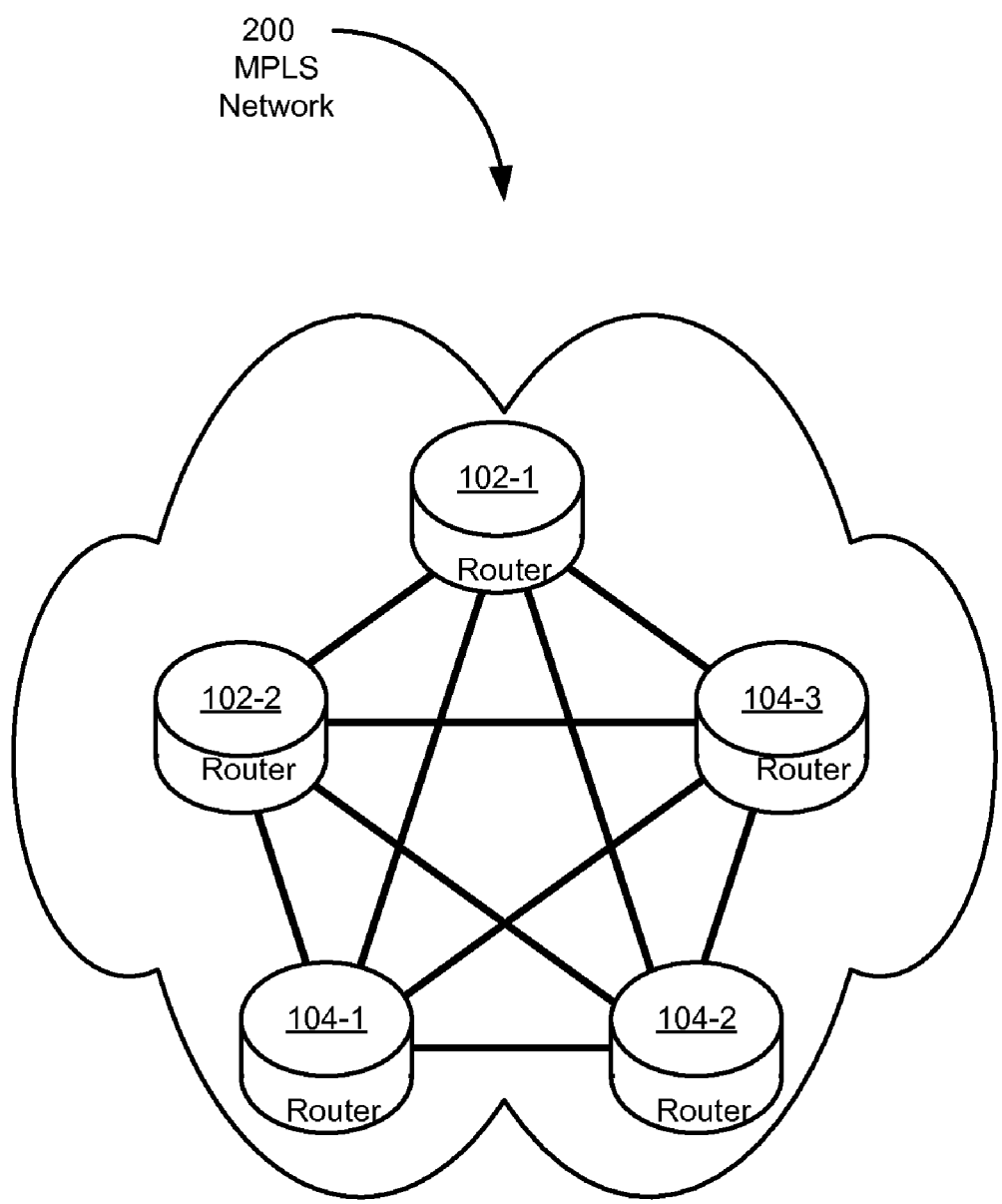
FIG. 2 shows an exemplary fully meshed MPLS network that includes devices of FIG. 1.

FIG. 2 shows an exemplary fully meshed MPLS network 200. As shown, fully meshed MPLS network 200 may include routers 102-1, 102-2, 104-1, 104-2, and 104-3. Furthermore, each of routers 102-1, 102-2, 104-1, 104-2, and 104-3 may be connected to every other one of the routers in fully meshed MPLS network 200 via LSPs. The total number of LSPs in a fully meshed MPLS network may be given by n (n−1)/2, where n is the number of routers/nodes in the fully meshed MPLS network. For fully meshed MPLS network 200, n=5, therefore, the total number of LSPs=5 (4)/2=10 paths. As mentioned above, in network 100, the total number of LSPs may be 3 paths.

While the difference in number of LSPs in network 100 and network 200 may be small, such difference can become large for MPLS networks that include a large number of routers. For MPLS networks that support RSVP-TE, the large number of LSPs can impose significant burden on routing and network load.

Figure 3:
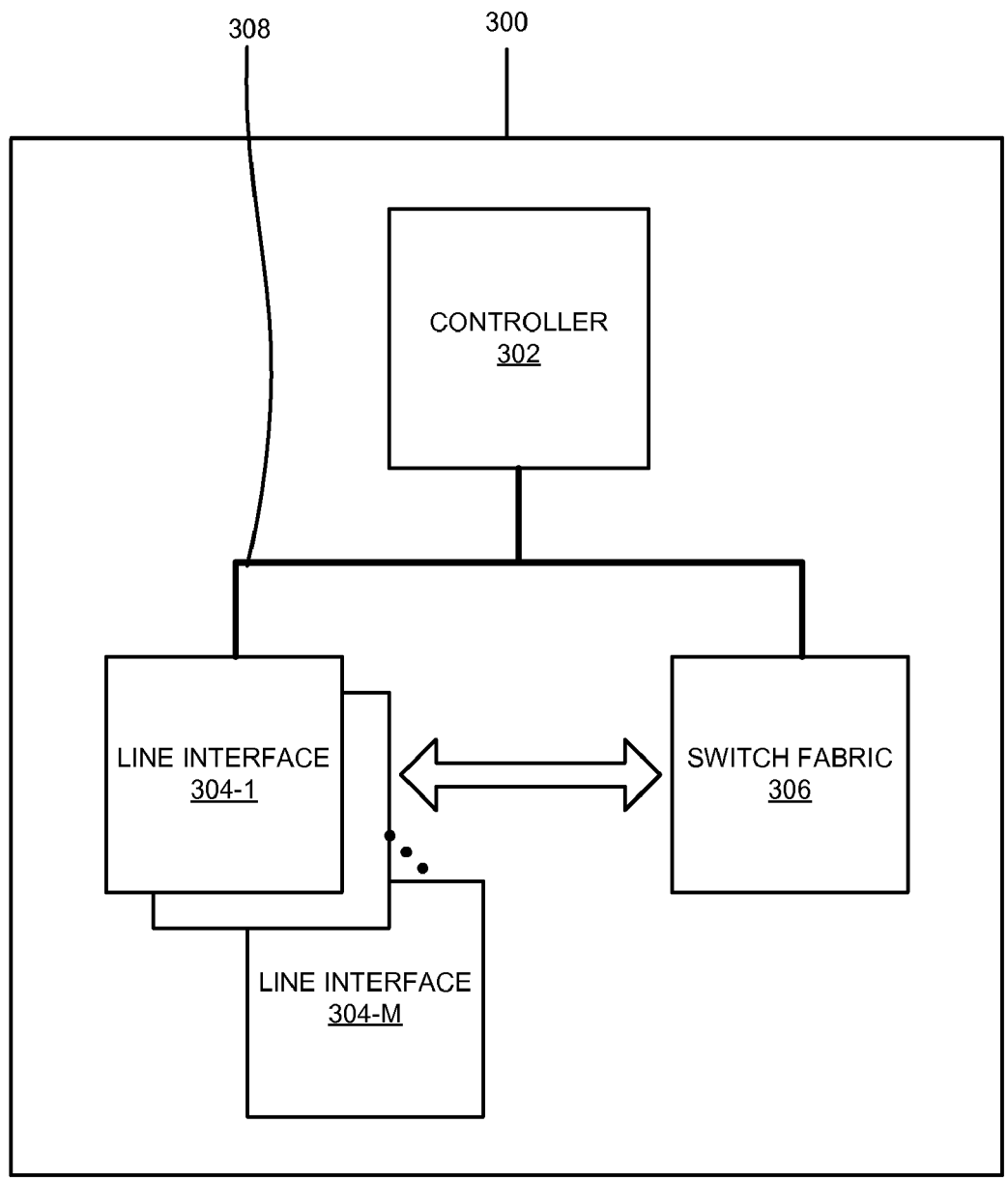
FIG. 3 is a block diagram of an exemplary network device of FIG. 1.

FIG. 3 is block diagram of an exemplary network device 300. Network device 300 may represent any of routers 102-1, 102-2, 104-1, 104-2, or 104-3. As shown, network device 300 may include a controller 302, M line interfaces 304-1 through 304-M (herein collectively referred to as line interface 304 and individually as 304-x), a switch fabric 306, and a communication path(s) 308. Depending on the implementation, network device 300 may include additional, fewer, or different components than those illustrated in FIG. 3. For example, in one implementation, network device 300 may include additional modules for providing network services, such as a firewall service, a load balancing service, etc.

Controller 302 may include one or more devices for managing routes and/or performing services relating to a centralized processing. Controller 302 may include a processing unit and a memory. The processing unit may include one or more processors, microprocessors, Application Specific Integrated Circuits (ASICs), and/or Field Programmable Gate Arrays (FPGAs), and/or other processing logic. The memory may include static memory, such as read only memory (ROM), and/or dynamic memory, such as random access memory (RAM), or onboard cache, for storing data and machine-readable instructions. The memory may also include storage devices, such as a floppy disk, CD ROM, CD read/write (R/W) disc, and/or flash memory, as well as other types of storage devices.

Line interfaces 304 may include devices for receiving packets from devices in network 100 and for transmitting the packets to other network devices in network 100 (e.g., network devices 102-1, 102-2, etc.). In addition, line interface 304-x may perform packet forwarding, packet classification, and/or internal redirection of packets to other components in network device 300 (e.g., other line interfaces 304).

Switch fabric 306 may include switches for conveying packets to/from line interfaces 304 from/to others of line interfaces 304. Communication path(s) 308 may provide a path and/or interface through which components of network device 300 can communicate with one another.

Figure 4:
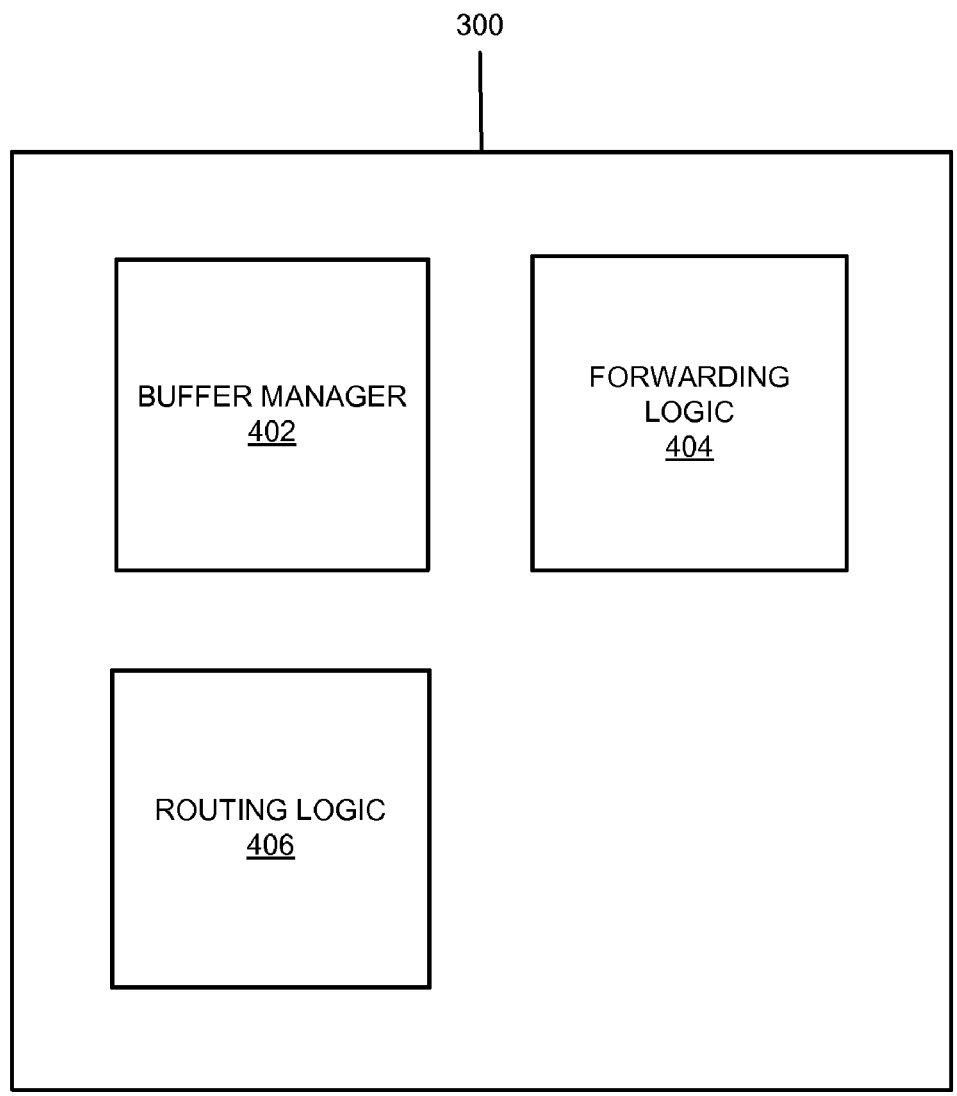
FIG. 4 is a functional block diagram of the exemplary network device of FIG. 3.

FIG. 4 is functional block diagram of elements implemented in network device 300. As shown, network device 300 may include a buffer manager 402, forwarding logic 404, and routing logic 406. These elements may be implemented in controller 302, line cards 304, and/or switch fabric 306. Buffer manager 402 may provide a buffer for queuing incoming packets. If packets arrive simultaneously, one or more of the packets may await in the buffer until higher priority packets are processed and/or transmitted. Forwarding logic 404 may include hardware and/or software for directing a packet to a proper output port on line interface 304-x based on routing information. In addition, forwarding logic 404 may include components for packet classification and/or packet scheduling. Routing logic 406 may include hardware and/or software for communicating with other routers to gather and store routing information in a routing information base (RIB).

Figure 5:
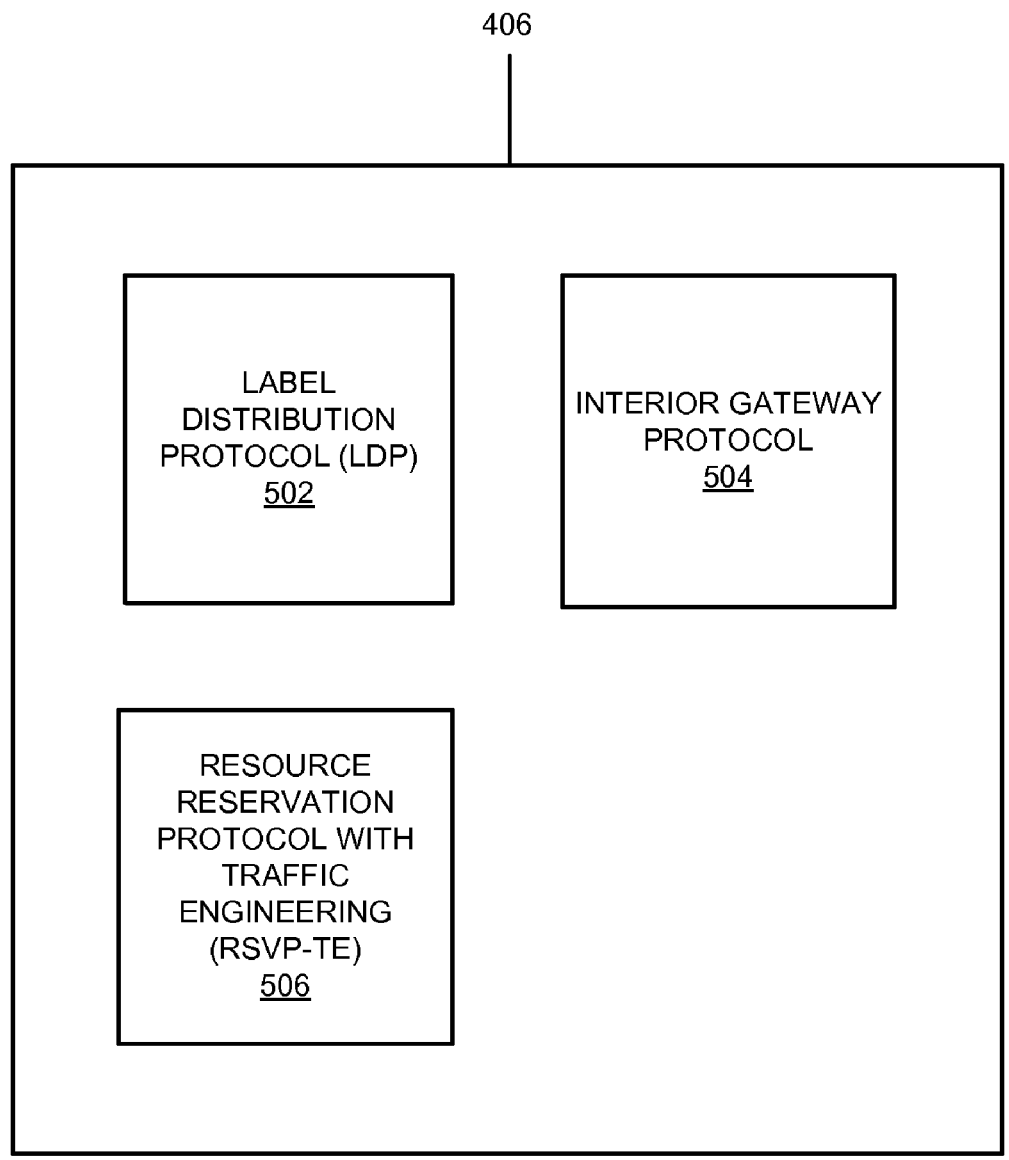
FIG. 5 is a functional block diagram of exemplary routing logic of the exemplary network device of FIG. 4.

FIG. 5 is a functional block diagram of routing logic 406. As shown, routing logic 406 may include Label Distribution Protocol (LDP) logic 502, Interior Gateway Protocol (IGP) logic 504, and RSVP-TE logic 506. In different implementations, routing logic 406 may include additional, fewer, or different components than those illustrated in FIG. 5. For example, in one implementation, routing logic 406 may include exterior border gateway protocol (EBGP) logic. In another example, RSVP-TE logic 506 may be replaced by constraint-based routing-LDP (CR-LDP) logic. In such a case, CR-LDP may use LDP messages and/or extensions to LDP messages to set explicit paths under constraints, such as route constraints, quality of service (QoS) constraints, etc., for meeting traffic engineering requirements. CR-LDP may provide constrained shortest path first (CSPF) calculations for best path selection.

LDP logic 502 may include hardware and/or software for sharing labels (e.g., network addresses of routers in a MPLS network) with other routers within MPLS network 100. In accordance with the label distribution protocol, LDP logic 502 may enforce a specific set of procedures for exchanging messages (e.g., LDP messages) about labels. Through the exchange of LDP messages, a label information base (LIB) of each router in MPLS network 100 may be populated with routing and label information.

IGP logic 504 may include hardware and/or software for maintaining and/or updating routing tables based on one or more routing protocols. Each of the possible routing protocols may be either a distance-vector type or a link-state type. In distance-vector type protocols, each router may populate its routing tables by using information about local interconnections. Examples of the distance-vector routing protocol may include Routing Information Protocol (RIP), Interior Gateway Routing Protocol (IGRP), or Enhanced Interior Gateway Routing Protocol (EIGRP). In link-state type protocols, each router may possess information about a complete network topology, and may compute paths based on both the complete network topology and local connection information. Examples of the link-state type protocol may include Open Shortest Path First (OSPF), or Intermediate System-to-Intermediate System (IS-IS) protocol.

RSVP-TE logic 506 may include hardware and/or software for implementing resource reservation protocol to support QoS and traffic engineering. More specifically, RSVP-TE logic 506 may employ a RSVP daemon to exchange RSVP messages with other RSVP daemons.

The messages that are exchanged between different RSVP daemons on different network devices (e.g., different routers in network 100) may fall into one of two categories of messages: path messages or reservation messages. Path messages may propagate information about a path in each node along the path. The propagated information may include the previous hop's unicast address. Reservation messages may be sent by nodes that have received the path messages. The reservation messages may be sent upstream toward the nodes that have sent the path messages, based on the received unicast addresses. The reservation messages may reserve network resources in the nodes/network devices.

As a consequence of exchanging various messages, RSVP-TE logic 506 may place network devices/nodes in "soft states." Network devices in soft states may exchange refresh messages periodically between peers for notification that a connection is still desired. If refresh messages are not exchanged, a timer in RSVP-TE logic 506 may sense that the connection is dormant, delete state information associated with the dormant connection, and return reserved bandwidths to a pool of resources.

Because a number of refresh messages may depend on the number of LSPs in a MPLS network, when the MPLS network includes a large number of LSPs, RSVP-TE logic 506 may be vulnerable to performance degradations. For example, given a full mesh MPLS network as illustrated in FIG. 2, performance of RSVP-TE logic 506 may degrade with increasing number of LSPs. For MPLS networks that include a large number of routers, the performance degradation can be severe, as the number of LSPs may increase by $O(n^2)$, where n is the number of routers in the MPLS network. Such increases may lead to a flood of refresh messages to network devices in the MPLS network. Other types of issues that may occur from having a fully meshed network may include: increased resource consumption with increased number of paths and an increased number of reconfigurations that may need to performed when a new router/node is added to the fully meshed MPLS network.

Figure 6:
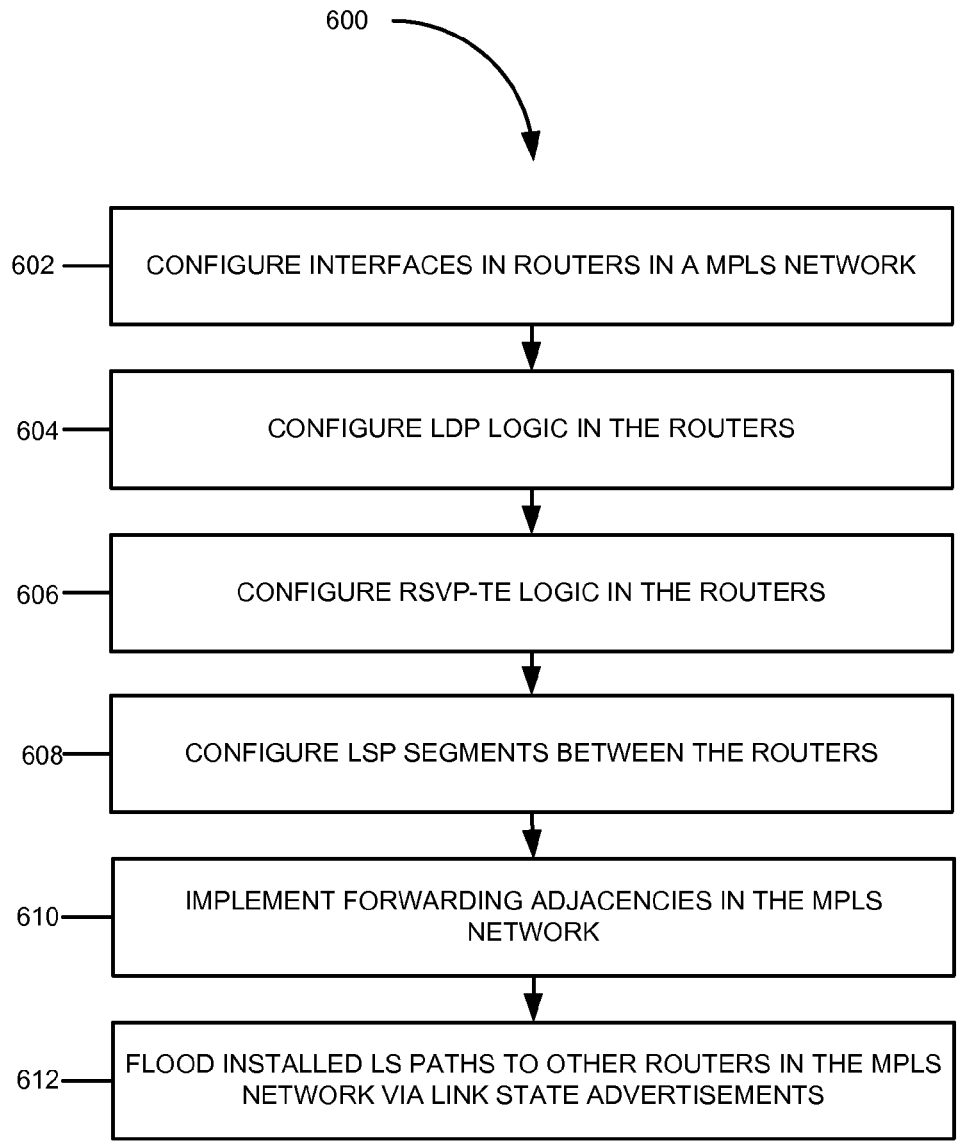
FIG. 6 shows an exemplary process for establishing hierarchical segmented label switched (LS) paths.

The above paragraphs describe system elements that are related to establishing hierarchical segmented LSPs in MPLS networks. FIG. 6 depicts an exemplary process that is capable of being performed on one or more of these system elements.

FIG. 6 shows an exemplary process 600 for implementing hierarchical segmented LSPs. Assume that routers in a MPLS network are grouped and interconnected in accordance with their levels of LSP tunneling hierarchy. Process 600 may begin by configuring interfaces (e.g., interfaces 304) at different routers in the MPLS network (block 602). For example, a Maximum Transmission Unit (MTU) for each interface in different groups of routers may be set to account for different labels that are needed for creating LSP.

LDP logic 502 in the routers may be configured (block 604). For example, LDP logic 502 may be configured so that LDP is not in effect when forwarding logic 404 is actively carrying traffic in accordance with RSVP packet scheduling. In addition LDP logic 502 may be configured to employ Message Digest 5 (MD5) authentication for security purposes.

RSVP-TE logic 506 may be configured in the routers (block 606). The configuration may involve, for example, turning on tracing mechanisms for trouble-shooting, bundling several refresh messages into one refresh message to reduce the overall number of refresh messages that are exchanged between the routers, enabling a reliable exchange of RSVP messages, enabling MD5 authentication to protect Transmission Control Protocol (TCP) sessions between the routers, etc.

In another example, RSVP-TE logic 506 may be configured to obtain LSPs that enforce what may be termed an explicit-null label, as explained below. In a MPLS network, the header of a packet that travels on a LSP may include path information in a set of labels (e.g., a label stack) that specify routers in the MPLS network. While the packet is traveling on the LSP, each router on the LSP may operate on the labels (e.g., replace a label with another label, push a new label onto the label stack, pop a label on the label stack, etc.). Typically, a new label may be pushed on the label stack of a packet that enters an ingress router, and popped from the label stack as the packet exits the MPLS network through an egress router.

In some situations, however, a router (e.g., a penultimate router) that is one hop away from the egress router may pop the top label of a label stack of the packet being forwarded. Such an operation may be termed "penultimate hop popping (PHP)." If a special label, known as an explicit-null, is present at the top of the label stack, the penultimate router may forward the packet to the egress router without popping the label from the label stack. In such a case, the egress router may pop the label and complete an ultimate hop popping (UHP). Because PHP does not alter forwarding decisions on RSVP segments, explicit-null may be used when LDP is not present.

In yet another example, RSVP-TE logic 506 may be configured to be in an adaptive mode. In such an instance, RSVP-TE logic 506 may use shared explicit (SE) reservation style. In SE reservation style, resources are shared via explicit reservations, where bandwidths on links that are shared by old and new paths may not be counted twice as being reserved. SE reservation style may contribute to smooth rerouting.

In still another example, RSVP-TE logic 506 may be configured to determine new best LSPs at particular time intervals. Topology changes can cause the current paths to become suboptimal compared to a new best path. The topology changes may be the result of metric changes, link up/down events, etc. In some settings, determining new best paths may involve evaluating only the IS-IS metric.

LSP segments between the routers may be configured (block 608). LSP segments within each group may be determined and installed in different routers.

Forwarding adjacencies (e.g., endpoints of forwarding adjacency LSPs) may be implemented in the MPLS network (block 610). Implementing the forwarding adjacencies may entail installing LSPs in databases for a specific protocol (e.g., an IS-IS database, a CSPF database, etc.) at particular routers within the MPLS network. In addition, once implemented, the forwarding adjacencies may inherit the underlying metric for the specific protocol for directly connected or single-hop LSPs.

The installed LSPs may be flooded to other routers in the MPLS network via link state advertisements (LSA) (block 612). Accordingly, the forwarding adjacencies may be received by all other network level 2 routers.

Figure 7:
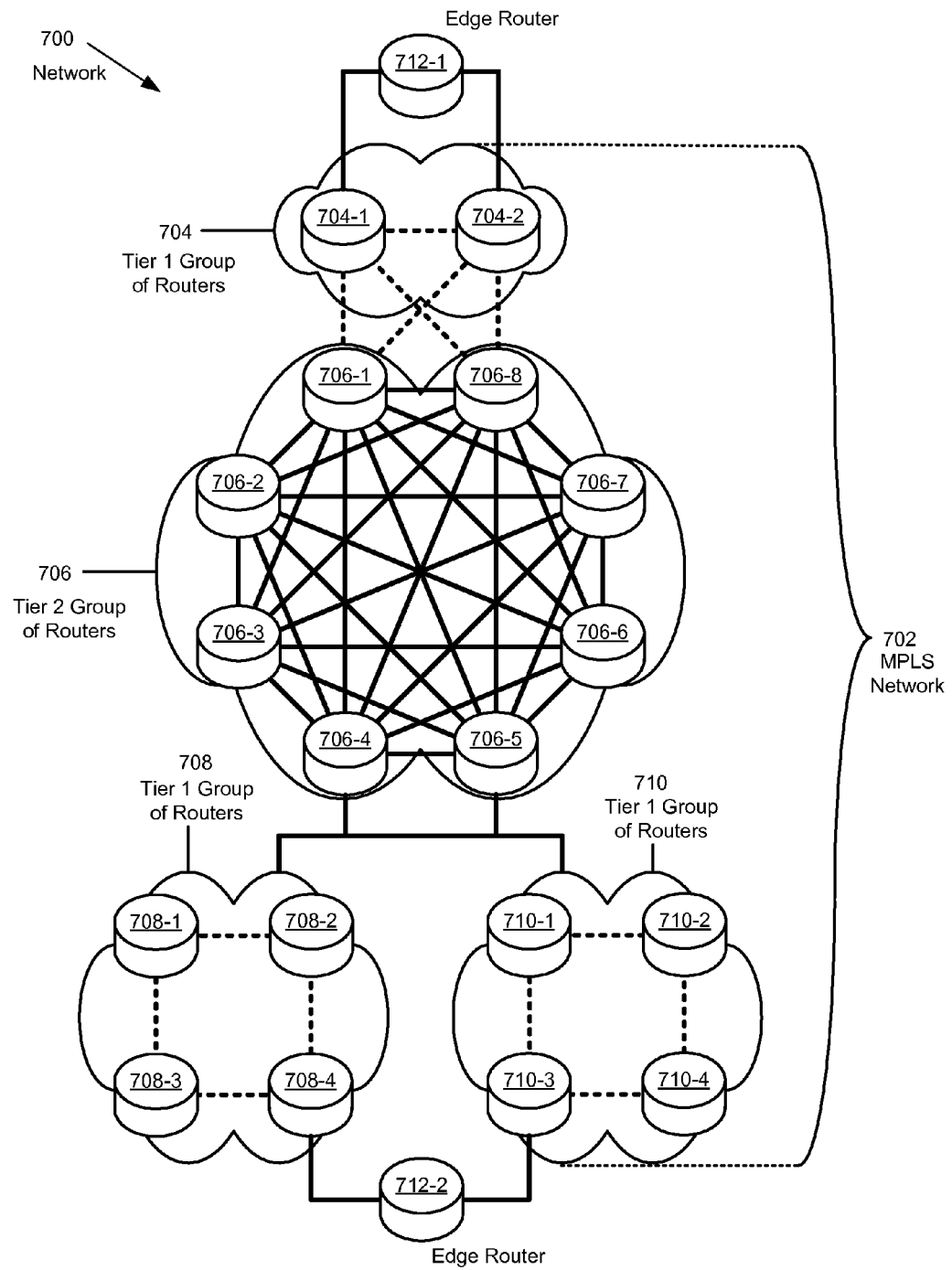
FIG. 7 is a block diagram of a simplified network that establishes hierarchical segmented LSPs.

The exemplary process, described above in connection with FIG. 6, for establishing hierarchical segmented LSPs, may be further illustrated through the following example, in connection with FIG. 7. As shown, a network 700 may include a MPLS network 702, a customer edge router 712-1, and a customer edge router 712-2. Assume, in this example, that MPLS network 702 is being prepared to provide packet transport services to customer edge routers 712-1 and 712-2.

As further shown, MPLS network 702 may include routers in tier 1 group 704, tier 2 group 706, tier 1 group 708, and tier 1 group 710. Each of the routers in tier 1 groups 704, 708, and 710 may include upstream LSPs (e.g., LSP segments to routers in tier 2 group 706), LSPs downstream (e.g., LSP segments to one of customer edge routers 712-1 or 712-2), and LSPs to other routers of the same group. Routers in tier 2 group 706 may be fully meshed to other routers of tier 2 group 706. Each of customer edge routers 712-1 and 712-2 may have at least two connections to MPLS network 702 for failover purposes.

In the example, after the routers in network 700 are interconnected, interfaces of the routers are configured. For example, a MTU may be set to 9100. LDP logic 502 in each of the routers are used to exchange LDP messages and may be configured so that LDP will no longer be in effect when forwarding logic 404 in the router is actively carrying traffic in accordance with RSVP.

In addition, RSVP-TE logic 506 in the routers in MPLS network 702 may be configured so that tracing mechanisms are turned on, refresh messages will be bundled, UHP is used, RSVP-TE logic 506 is in the adaptive mode, reliable communication takes place between the routers, and new best paths are determined at certain time intervals. Moreover, due to security considerations, RSVP-TE logic 506 may be configured to use MD5 authentication to protect TCP sessions between the routers. In certain situations, MD5 can be turned off, as the encryption/decryption for MD5 may add to the overall computational load per node in MPLS network 702. In a hierarchical segmented MPLS network, MD5 generally can be retained to avoid exposing the network to security risks even if the network is large, because the network topology provides for scaling. In a network that does not scale, it may be necessary to turn off MD5 to reduce the network load when the network is large.

After forwarding adjacencies are installed in IS-IS databases of the routers in tier 2 group 706, and the forwarding adjacency LSPs are flooded into tier 1 groups 704, 708, and 710, MPLS network 702 is ready for operation of RSVP-TE and active forwarding of network traffic.

In the example, MPLS network 702 is arranged in tiers, such that LSPs from a customer edge router 712-1 to 712-2 may be segmented. Such an arrangement may help in improving the performance of network 700. For example, if a fully meshed MPLS network were implemented in place of a hierarchical segmented MPLS network 702, the use of RSVP-TE may cause performance of network 700 to deteriorate with increasing number of routers in the fully meshed MPLS network. Reducing the number of refresh messages in the fully meshed MPLS network via various techniques (e.g., bundling) may alleviate the problem for LSPs that traverse a common path (e.g., equal cost multiple paths (ECMP) LSPs), but the scaling problem may still be impacted by the increased number of unique paths and endpoints.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIG. 6, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network system comprising:
   first routers, connected in a fully-meshed topology, at a first level of a multi-protocol label switched tunneling hierarchy;
   second routers at a second level of the multi-protocol label switched tunneling hierarchy, the second routers connected to the first routers in a partially meshed topology, where each of the second routers include:
      a first upstream label switched path segment that connects the second router to one of the first routers,
      a first downstream label switched path segment that connects the second router to a first edge router, and
      a first label switched path segment that connects the second router to another second router;
   third routers at the second level of the multi-protocol label switched tunneling hierarchy, the third routers connected to the first routers in a partially meshed topology, where each of the third routers include:
      a second upstream label switched path segment that connects the third router to one of the first routers,
      a second downstream label switched path segment that connects the third router to a second edge router, where the second edge router is different from the first edge router, and
      a second label switched path segment that connects the third router to another third router; and
   a hierarchical segmented label switched path to transmit data between the first edge router and the second edge router, the hierarchical segmented label switched path including:
      a forwarding adjacency label switched path including a subset of the first routers;
      a first label switched path coupled to the forwarding adjacency label switched path, the first label switched path including one of the first upstream label switched path segments, one of the first downstream label path segments, and one of the first label stream path segments, and
      a second label switched path coupled to the forwarding adjacency label switched path, the second label switched path including one of the second upstream label switched path segments, one of the second downstream label path segments, and one of the second label stream path segments.

2. The system of claim 1, where at least one of the first routers includes at least one of:
   traffic engineering-resource reservation protocol (RSVP-TE) logic; or
   constraint-based routing label distribution protocol logic.

3. The system of claim 2, where the traffic engineering-resource reservation protocol logic is to:
   send refresh messages to other routers, of the first routers, the second routers, and the third routers, in the system.

4. The system of claim 1, where each one of the subset of the first routers includes at least one of:
   intermediate system-to-intermediate system protocol logic;
   open shortest path first protocol logic; or
   constrained shortest path first protocol logic.

5. The system of claim 4, where each one of the subset of the first routers includes the intermediate system-to-intermediate system protocol logic, and where the intermediate system-to-intermediate system protocol logic is to:

flood other routers in the system with information about the forwarding adjacency labeled switched path.

6. The system of claim 1, where each one of the subset of the first routers includes interior gateway protocol logic.

7. The system of claim 1, where the first edge router comprises:

a customer edge router that is coupled to each of the second routers, and where the second edge router comprises another customer edge router that is coupled to each of the third routers.

8. The system of claim 1, where each of the first routers are to forward a packet that includes an explicit null label, without removing the explicit null label, when a label distribution protocol is not in effect.

9. A method comprising:

establishing, by a plurality of first routers, label switched path segments to connect the plurality of first routers in a fully-meshed topology at a first level of a multi-protocol label switched tunneling hierarchy;

establishing, by a plurality of second routers, label switched path segments to connect the plurality of second routers in a partially-meshed topology at a second level of the multi-protocol label switched tunneling hierarchy, where, for each of the plurality of second routers, a label switched path segment is established between:

the second router and one of the plurality of first routers, the second router and an edge router, and the second router and another one of the plurality of second routers;

establishing, by a plurality of third routers, label switched path segments to connect the plurality of third routers in a partially-meshed topology at the second level of the multi-protocol label switched tunneling hierarchy, where, for each of the plurality of third routers, a label switched path segment is established between:

the third router and one of the plurality of first routers, the third router and another edge router, and the third router and another one of the plurality of third routers;

sending, by a subset of the plurality of first routers, information associated with a forwarding adjacency label switched path to the plurality of second routers and to the plurality of third routers;

forming a tunnel from an ingress router, of the plurality of second routers, to an egress router, of the plurality of third routers, based on the information associated with the forwarding adjacency label switched path;

receiving, by the ingress router, a packet from the edge router;

transmitting, via the tunnel, the packet to the egress router; and transmitting, by the egress router, the packet to the other edge router.

10. The method of claim 9, further comprising:

configuring the subset of the plurality of first routers, where configuring the subset of the plurality of first routers includes:

provisioning forwarding adjacency label switched paths in the subset of the plurality of first routers.

11. The method of claim 10, where configuring the subset of the plurality of first routers includes:

storing forwarding adjacency information into an intermediate system-to-intermediate system database.

12. The method of claim 9, where forming the tunnel includes:

creating a label switched path via traffic engineering resource reservation protocol.

13. The method of claim 10, where configuring the subset of the plurality of first routers includes:

setting a maximum transmission unit for interfaces of the subset of the plurality of first routers.

14. The method of claim 10, where configuring the subset of the plurality of first routers includes:

enabling label distribution protocol logic in the subset of the plurality of first routers to use message digest 5 authentication.

15. The method of claim 10, where configuring the subset of the plurality of first routers includes:

configuring traffic engineering-resource reservation protocol logic in the subset of the plurality of first routers to use shared explicit reservation style.

16. The method of claim 10, where configuring the subset of the plurality of first routers includes:

configuring traffic engineering-resource reservation protocol logic in the subset of the plurality of first routers to determine best paths at particular time intervals.

17. The method of claim 9, where transmitting the packet to the egress router includes:

exchanging path messages; and exchanging reservation messages.

18. A system for providing packet transport services to a first edge router and a second edge router, the system comprising:

a first group of routers at a first level of a multi-protocol label switched (MPLS) tunneling hierarchy, where the first group of routers is connected in a fully-meshed topology, and where the first group of routers includes a first forwarding adjacency and a second forwarding adjacency that form a first forwarding adjacency label switched path (LSP) through the first group of routers;

a second group of routers at a second level of the MPLS tunneling hierarchy, where the second group of routers is connected in a partially meshed topology, and where each router, of the second group of routers, is connected to the first edge router, another router, of the second group of routers, and the first forwarding adjacency; and a third group of routers at the second level of the MPLS tunneling hierarchy, where the third group of routers is connected in a partially meshed topology, and where each router, of the third group of routers, is connected to the second edge router, another router, of the third group of routers, and the second forwarding adjacency.

19. The system of claim 18, further comprising:

a fourth group of routers at the second level of MPLS tunneling hierarchy, where the fourth group of routers is connected in a partially meshed topology, and where the first group of routers further comprises:

a third forwarding adjacency and a fourth forwarding adjacency that form a second forwarding adjacency LSP through the first group of routers, where each router, of the fourth group of routers, is connected to the first edge router, another router, of the fourth group of routers, and the third forwarding adjacency, and where at least two routers, of the third group of routers, is connected to the fourth forwarding adjacency.

20. The system of claim 1, where each of the first routers are to:

exchange label distribution protocol messages with other routers in the system to share labels with the other routers, populate, based on exchanging the label distribution protocol messages, a label information base with routing information and label information, and forward, based on the routing information and the label information, data through the system.

* * * * *